(12) United States Patent
Provost et al.

(10) Patent No.: US 10,502,018 B2
(45) Date of Patent: Dec. 10, 2019

(54) LINEAR SELECTIVE PROFILE ACTUATION SYSTEM

(71) Applicants: Wilfred Provost, Tomball, TX (US); Daniel Napier, Lafayette, LA (US)

(72) Inventors: Wilfred Provost, Tomball, TX (US); Daniel Napier, Lafayette, LA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 206 days.

(21) Appl. No.: 15/658,866

(22) Filed: Jul. 25, 2017

(65) Prior Publication Data

US 2019/0032444 A1 Jan. 31, 2019

(51) Int. Cl.
| | |
|---|---|
| *E21B 34/14* | (2006.01) |
| *E21B 33/128* | (2006.01) |
| *E21B 7/28* | (2006.01) |
| *E21B 33/12* | (2006.01) |
| *H02K 41/02* | (2006.01) |
| *E21B 3/00* | (2006.01) |
| *E21B 4/02* | (2006.01) |

(52) U.S. Cl.
CPC ............ *E21B 33/1285* (2013.01); *E21B 7/28* (2013.01); *E21B 33/1216* (2013.01); *H02K 41/02* (2013.01); *E21B 3/00* (2013.01); *E21B 4/02* (2013.01)

(58) Field of Classification Search
CPC .................................. E21B 34/02; E21B 34/14
See application file for complete search history.

(56) References Cited

U.S. PATENT DOCUMENTS

| 7,878,257 | B2* | 2/2011 | Chen ....................... E21B 23/04 |
| | | | 166/318 |
| 8,469,109 | B2* | 6/2013 | Wang ....................... E21B 34/14 |
| | | | 166/194 |
| 8,668,018 | B2 | 3/2014 | Fay |
| 9,238,953 | B2* | 1/2016 | Fleming ................ E21B 23/006 |
| 9,512,695 | B2* | 12/2016 | Pabon ..................... E21B 34/14 |
| 9,534,471 | B2 | 1/2017 | Etzel |
| 9,926,773 | B2* | 3/2018 | Hallundbaek ....... E21B 33/1275 |
| 10,125,573 | B2* | 11/2018 | Flores Perez .......... E21B 33/14 |

(Continued)

FOREIGN PATENT DOCUMENTS

| CA | 2853932 A1 | 5/2013 |
| WO | 2016018429 A1 | 2/2016 |

*Primary Examiner* — Kenneth L Thompson
(74) *Attorney, Agent, or Firm* — Cantor Colburn LLP

(57) ABSTRACT

A linear selective profile actuation system including a traveling actuation member having a selective profile, the selective profile being resilient or rigid and possessed of a shoulder, a resource recovery tool having a tool profile, the tool profile being resilient or rigid, providing at least one of the selective profile or the tool profile is resilient, the tool profile being possessed of a seat, the tool profile and selective profile being configured to engage the shoulder and seat without resilient action from either the tool profile or selective profile if the selective profile is complementary to the tool profile or to resiliently pass the traveling actuation member if the selective profile is not complementary to the tool profile. A method for actuating a resource recovery tool. A resource recovery system including a borehole, a tubular string in the borehole, a resource recovery tool having a tool profile.

17 Claims, 5 Drawing Sheets

(56) References Cited

U.S. PATENT DOCUMENTS

2010/0252280 A1* 10/2010 Swor ...................... E21B 34/14
166/386
2018/0223627 A1* 8/2018 Pabon .................... E21B 34/14

* cited by examiner

LINEAR SELECTIVE PROFILE ACTUATION SYSTEM

BACKGROUND

In the resource recovery industry, boreholes are used to access formations possessed of desirable resources. The boreholes may be many thousands of feet long and pass through target and undesirable regions. This leads to the need to have many types of resource recovery tools that are used in such boreholes. Often, such tools require activation at particular times and hence it is commonly necessary to take action outside of the borehole with something that will have an actuation effect on a tool within the borehole. It is known to use different profiles on tools in the borehole so that a specific tool may be addressed by taking action from surface, for example with a selected complementary profile to ensure engagement of the proper profile downhole will occur. While these generally work sufficiently, the art is always receptive to improvements.

SUMMARY

A linear selective profile actuation system including a traveling actuation member having a selective profile, the selective profile being resilient or rigid and possessed of a shoulder, a resource recovery tool having a tool profile, the tool profile being resilient or rigid, providing at least one of the selective profile or the tool profile is resilient, the tool profile being possessed of a seat, the tool profile and selective profile being configured to engage the shoulder and seat without resilient action from either the tool profile or selective profile if the selective profile is complementary to the tool profile or to resiliently pass the traveling actuation member if the selective profile is not complementary to the tool profile.

A method for actuating a resource recovery tool using the system as in any prior embodiment including contacting the tool profile with the traveling actuation member, sliding the land along a counter-land of the tool profile and then the first in time to occur of contacting an expander of the tool profile with the lead step and thereby expanding the tool profile or landing the traveling actuation member on the seat of the tool profile without resilient action.

A resource recovery system including a borehole, a tubular string in the borehole, a resource recovery tool having a tool profile therein disposed in the string, a traveling actuation member having a selective profile thereon, the selective profile including a land having a lead step and a length that either allows or disallows engagement of a seat of the tool profile and a shoulder of the selective profile without resilient action of either the tool profile or the selective profile.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
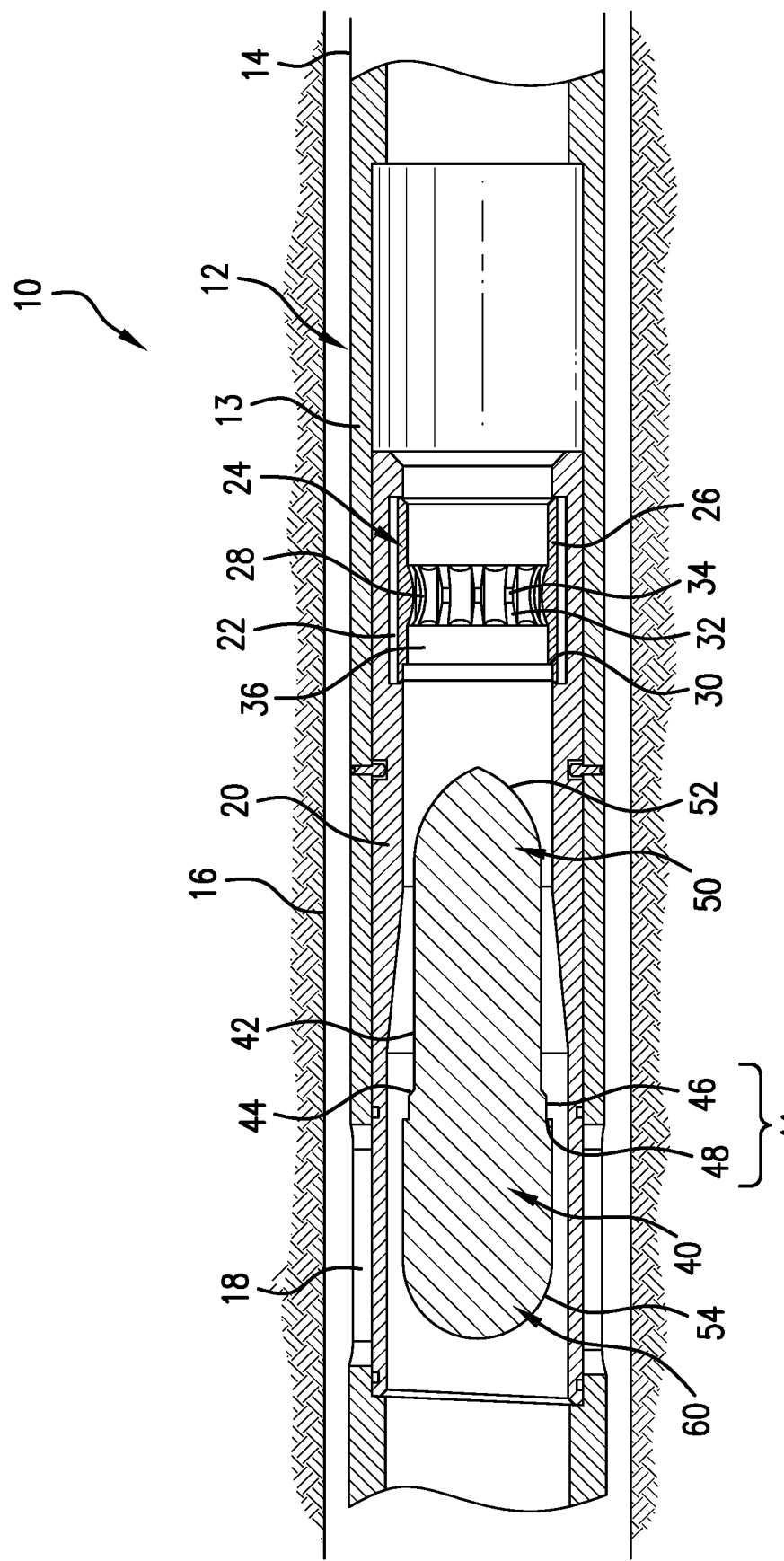
FIG. 1 is a cross sectional illustration of a linear selective profile actuation system.

Referring to FIG. 1, a linear selective profile actuation system 10 is illustrated. The system 10 includes a resource recovery tool 12 that is configured to be disposed as a part of a tubular string 14 within a borehole 16. The tool 12 may be any type of tool required in the borehole environment that requires actuation. As illustrated, the tool is a valve of the sliding sleeve variety though any other resource recovery tool is also contemplated. The illustrated tool 12 comprises a housing 13 and includes one or more port(s) 18 and sliding sleeve 20 that may be axially shifted to open or close the port 18. The sleeve 20 includes a recess 22 within which is disposed a tool profile 24. The tool profile 24 is configured as a resilient member and to be at rest in its smallest diameter position. In an iteration, the profile 24 is a C-ring or a split ring configuration that will allow the profile 24 to be radially outwardly expandable upon being urged in that direction by something passing therethrough with a larger outside diameter than the smallest inside diameter presented by the profile 24 in the at rest position. The recess 22 is hence, for this embodiment, configured to be radially deep enough in tool 12 to accommodate the expanded dimensions of the tool profile 24 when it is expanded for passage therethrough of a traveling actuation member 40 (discussed hereunder). In other embodiments, the tool profile 24 may be in the form of a collet where the fingers are radially outwardly expandable rather than radially inwardly deflectable or the tool profile 24 may be configured of an expandable and resilient polymeric composite such as rubber, etc.

The tool profile 24 comprises a body 26 having one or more expansion buttresses 28 and a seat 30. The expansion buttresses 28 include at least a ramp 32 and a peak 34, the peak 34 representing the smallest radial dimension of the tool profile 24 when at rest. Adjacent the expansion buttress 28 and between that buttress 28 and the seat 30 is a counter-land 36. It is to be understood that the differential radial dimension of the tool profile between the peak 34 and the counter-land 36 is at least as great as the radial thickness of the seat 30 such that if a body with a large enough diameter is passed through the buttress 28, the buttress will cause the tool profile 24 to expand sufficiently that the seat 30 will not be available for engagement with the traveling actuation member 40. It is further noted that the seat 30 may be orthogonally shaped or may have an undercut in some embodiments.

Figure 2:
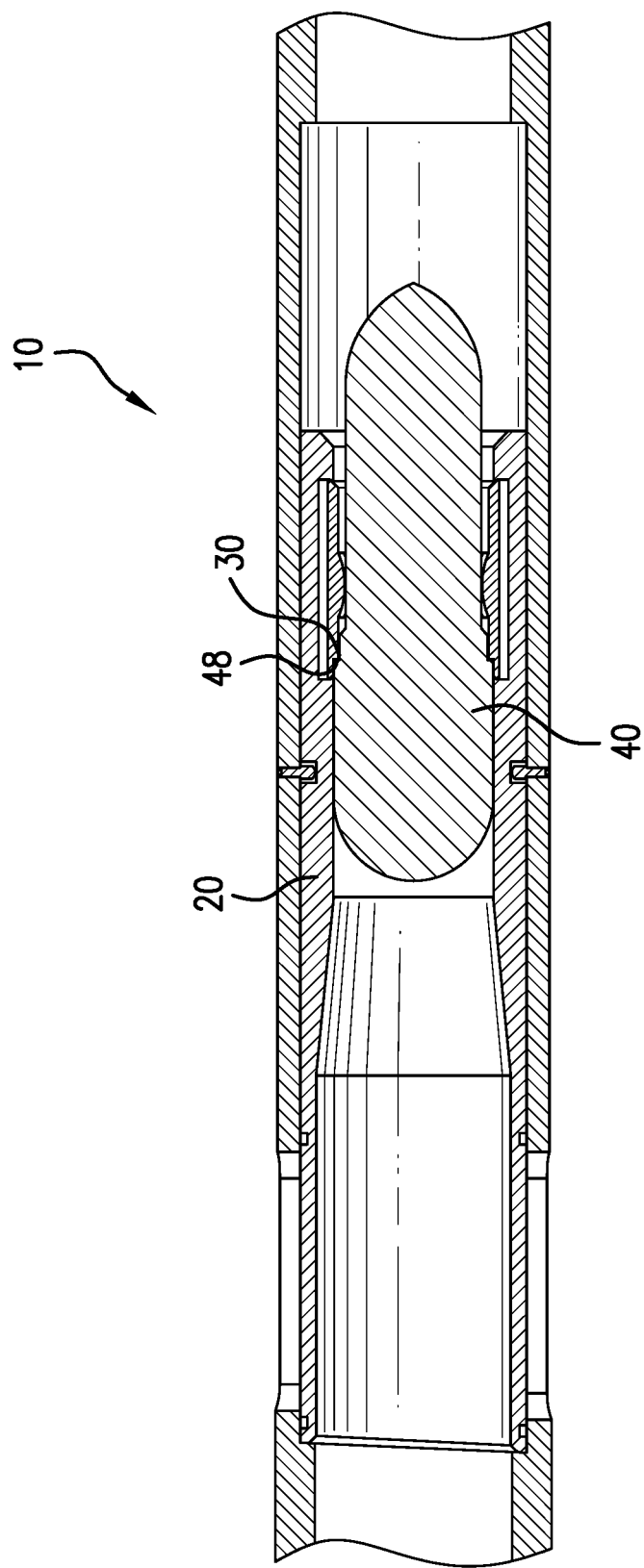
FIG. 2 is a cross section of the system of FIG. 1 illustrating a traveling actuation member in a seated position.
Figure 3:
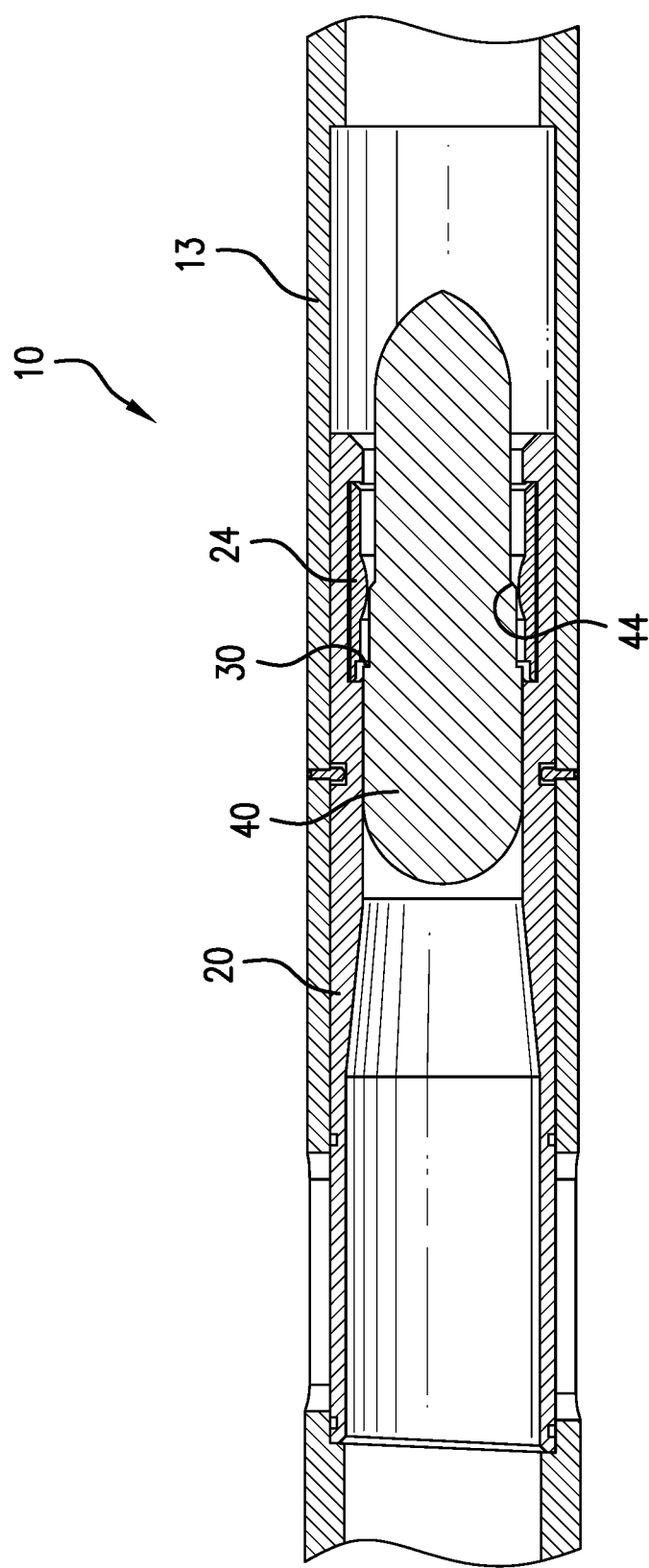
FIG. 3 is a cross section of the system of FIG. 1 illustrating the traveling actuation member in a passage position.
Figure 4:
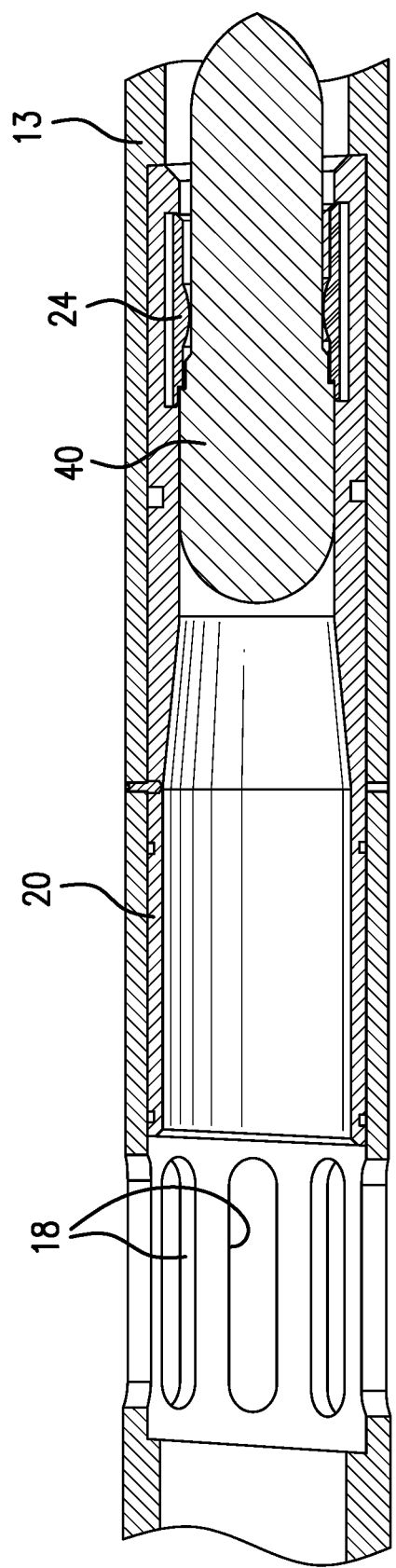
FIG. 4 is a cross section of the system of FIG. 1 illustrating the traveling actuation member having shifted a resource recovery tool.

Traveling actuation member 40 presents a selective profile 41 allowing the traveling actuation member to automatically select the correct tool profile 24 out of a number of tool profiles 24 that may be in a particular borehole 16. The selective profile 41 comprises a number of features including a mating diameter 42 that is dimensioned to centralize on one or more peaks 34 of one or more buttresses 28 of the tool profile 24. A wedge face 44 is adjacent the mating diameter and increases an outside diameter of the member 40 from the mating diameter to a land diameter, the land 46 being contiguous with the wedge face 44. Land 46 has a selected length that begins at the wedge face 44 and ends with a shoulder 48 (which in some embodiments will be orthogonal or in some embodiments may be back cut depending upon whether the seat 30 is orthogonal or back cut. If the land 46 is not longer than the counter-land 36 of a particular tool profile 24 then the traveling actuation member 40 will in the first instance engage its shoulder 48 with the seat 30 and the operation of plugging the tubing at this location is complete for the present operation. This is illustrated in FIG. 2. There is no need for the tool profile to expand and then snap back to engage the shoulder 48, a significant advantage over the prior art. If however the land 46 is longer than the counter-land 36, then the wedge face 44 will interact with the ramp 32 before the shoulder 48 engages the seat 30, and the interaction between the buttress 28 and the land 46 will ensure the traveling actuation member 40 will pass through the tool profile, hence automatically rejecting the particular traveling actuation member 40 for having the wrong selective profile 41 for the particular tool profile 24. This is illustrated in FIG. 3. Assuming the first discussed condition, that of FIG. 2 prevails, then pressure may be applied against the plug created by the traveling actuation member 40 engaging its shoulder 48 against the seat 30 of the tool profile 24 in order to actuate the tool 10. This is illustrated in FIG. 4, where the sleeve 20 is shifted and ports 18 are open.

A parameter that is useful for consideration in the creation of the traveling actuation member 40 is that the center of gravity of the member 40 should be ahead of a center of hydrodynamic drag for the member 40. Such configurations facilitate the traveling actuation member moving more efficiently and reducing any tumbling action that might otherwise occur. Supporting this ideal are various geometric configurations such as the first end 50, 150 and/or second end 60, 160 (see also alternative traveling actuation member 140 in FIG. 5 using one hundred series numerals for analogous parts as discussed above) of the traveling actuation member may include a nose cone and or a tail cone 52, 152 (or 152). The nose cone may be a bi-conic nose cone, a conic nose cone, an ogive nose cone, a parabolic nose cone, etc.

Tumbling action might cause the traveling actuation member 40 to become stuck somewhere it is not intended to remain. These last considerations are directed primarily to a traveling actuation member 40 that is untethered such as a dart configuration. Where the member 40 is tethered in some way back to surface, workstring, wireline, etc., then there is less concern about the center of gravity versus hydrodynamic drag.

Figure 5:
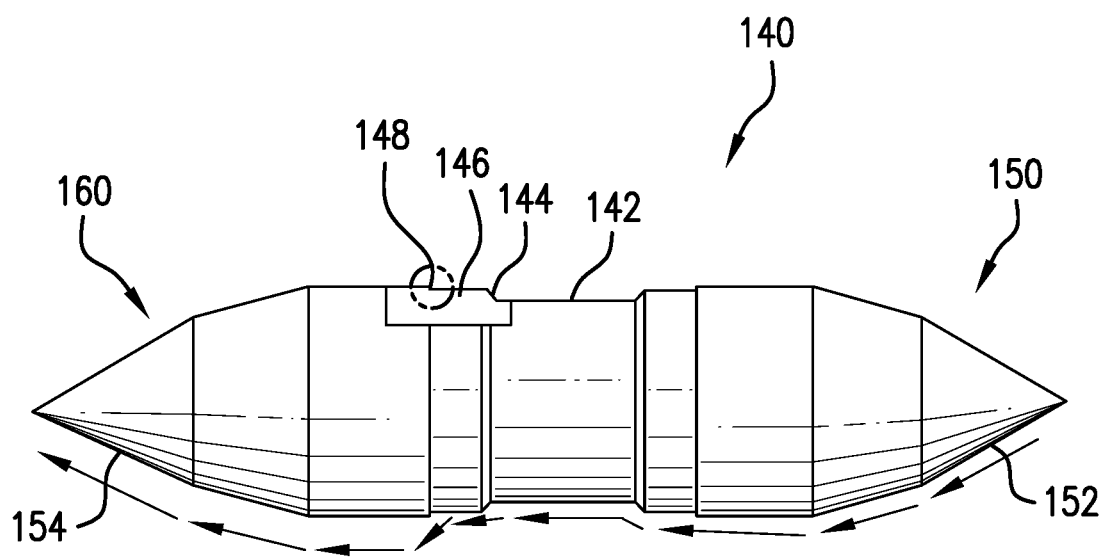
FIG. 5 is a cross section of an alternate embodiment of the traveling actuation member.

Referring to FIG. 5, one might notice that the traveling actuation member 140 is symmetrical end to end, meaning that there is a portion of the traveling actuation member 140 that will cause the tool profile 24 to expand prior to engagement of the shoulder 148 and seat 30. It is to be understood that the issue addressed is the time for snap-back of the profile. Prior art configurations can be unreliable because the profiles need to expand in order to engage and a rapidly moving member 140, 140 can slip through. In the FIG. 5 embodiment though, the portion of the member 140 that does expand the profile 24 early does so a long way before the shoulder comes into engagement range and the mating diameter 142 is long enough that the tool profile 24 has more than adequate time to snap back to position before the important sequence of mating profile/shoulder-seat, or mating profile/wedge face action occurs.

It is to be understood that the components hereof may be reversed in function with the same result. For example, if the tool profile is fixed and the selective profile is flexible (radially inwardly) but only is flexed radially inwardly after the automatic determination of complementality has been made the same result is achieved. Such reversal is contemplated herein and considered a part of the invention.

Stated again to ensure clarity, the configurations facilitate an operating condition distinct from the prior art. Specifically, the system 10 allows for the traveling actuation member 40 to seat on the tool profile 24 without the tool profile 24 having to expand to accommodate that member 40. In the art, resilient profiles always are first deflected and then lock into the complementary profile. This works only if the complementary profile is not moving at a high rate of speed. If it is moving at a high rate of speed, the rebound in the resiliency may not be fast enough to restore the position of the seat to where the shoulder of the traveling actuation member will engage with the seat. Accordingly the traveling actuation member may effectively be "missed" by the tool profile such that the intended actuation does not occur. Due to the configurations herein taught, the tool profile 24 or the resilient portion of the traveling actuation member 40 (in alternate embodiments) are aligned for seating the shoulder 48 on the seat 30 and no rebound is required since no deflection occurs until the automatic determination of complementality of the selective profile 41 and the tool profile 24 has been made. Resilience does not enter the operation of the system 10 until it is already known that the selective profile 41 is not intended to engage that tool profile 24.

Set forth below are some embodiments of the foregoing disclosure:

Embodiment 1

A linear selective profile actuation system including a traveling actuation member having a selective profile, the selective profile being resilient or rigid and possessed of a shoulder, a resource recovery tool having a tool profile, the tool profile being resilient or rigid, providing at least one of the selective profile or the tool profile is resilient, the tool profile being possessed of a seat, the tool profile and selective profile being configured to engage the shoulder and seat without resilient action from either the tool profile or selective profile if the selective profile is complementary to the tool profile or to resiliently pass the traveling actuation member if the selective profile is not complementary to the tool profile.

Embodiment 2

The system as in any prior embodiment wherein the traveling actuation member is an untethered member.

Embodiment 3

The system as in any prior embodiment wherein the untethered member is a dart.

Embodiment 4

The system as in any prior embodiment wherein the tool profile includes an expander at an innermost portion of the tool profile.

Embodiment 5

The system as in any prior embodiment wherein the selective profile includes a lead step and a land extending between the lead step and the shoulder, the length of the land dictating whether or not the selective profile is complementary to the tool profile.

Embodiment 6

The system as in any prior embodiment wherein the seat and shoulder each include a complementary back cut.

Embodiment 7

The system as in any prior embodiment wherein the tool profile is disposed in a recess providing space for the tool profile to be resiliently urged into the space such that the traveling actuation member may pass.

Embodiment 8

The system as in any prior embodiment wherein the traveling actuation member is configured to produce a center of hydrodynamic drag behind a center of gravity of the traveling actuation member when viewed in a direction of travel of the traveling actuation member.

Embodiment 9

The system as in any prior embodiment wherein the traveling actuation member includes a nose cone.

Embodiment 10

The system as in any prior embodiment wherein the traveling actuation member is asymmetric.

Embodiment 11

The system as in any prior embodiment wherein the tool profile is annularly discontinuous.

Embodiment 12

The system as in any prior embodiment wherein the tool profile is a C-ring.

Embodiment 13

The system as in any prior embodiment wherein the resource recovery tool is a valve.

Embodiment 14

A method for actuating a resource recovery tool using the system as in any prior embodiment including contacting the tool profile with the traveling actuation member, sliding the land along a counter-land of the tool profile and then the first in time to occur of contacting an expander of the tool profile with the lead step and thereby expanding the tool profile or landing the traveling actuation member on the seat of the tool profile without resilient action.

Embodiment 15

A resource recovery system including a borehole, a tubular string in the borehole, a resource recovery tool having a tool profile therein disposed in the string, a traveling actuation member having a selective profile thereon, the selective profile including a land having a lead step and a length that either allows or disallows engagement of a seat of the tool profile and a shoulder of the selective profile without resilient action of either the tool profile or the selective profile.

Embodiment 16

The system as in any prior embodiment wherein the resource recovery tool is a plurality of resource recovery tools each possessed of a counter-land having a specific length.

Embodiment 17

The system as in any prior embodiment wherein upon disallowance of engagement of the seat of the tool profile and the shoulder of the selective profile, the traveling actuation member is configured to automatically contact sequential tool profiles until engagement occurs.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A linear selective profile actuation system comprising:
a traveling actuation member having a selective profile, the selective profile being resilient or rigid and possessed of a shoulder;

a resource recovery tool having a tool profile, the tool profile being resilient or rigid, providing at least one of the selective profile or the tool profile is resilient, the tool profile being possessed of a seat, the tool profile and selective profile being configured to engage the shoulder and seat without resilient action from any part of the traveling actuation member or the tool profile if the selective profile is complementary to the tool profile or to resiliently pass the traveling actuation member if the selective profile is not complementary to the tool profile.

2. The system as claimed in claim 1 wherein the traveling actuation member is an untethered member.

3. The system as claimed in claim 2 wherein the untethered member is a dart.

4. The system as claimed in claim 1 wherein the tool profile includes an expander at an innermost portion of the tool profile.

5. The system as claimed in claim 1 wherein the selective profile includes a lead step and a land extending between the lead step and the shoulder, the length of the land dictating whether or not the selective profile is complementary to the tool profile.

6. The system as claimed in claim 1 wherein the seat and shoulder each include a complementary back cut.

7. The system as claimed in claim 1 wherein the tool profile is disposed in a recess providing space for the tool profile to be resiliently urged into the space such that the traveling actuation member may pass.

8. The system as claimed in claim 1 wherein the traveling actuation member is configured to produce a center of hydrodynamic drag behind a center of gravity of the traveling actuation member when viewed in a direction of travel of the traveling actuation member.

9. The system as claimed in claim 1 wherein the traveling actuation member includes a nose cone.

10. The system as claimed in claim 1 wherein the traveling actuation member is asymmetric.

11. The system as claimed in claim 1 wherein the tool profile is annularly discontinuous.

12. The system as claimed in claim 1 wherein the tool profile is a C-ring.

13. The system as claimed in claim 1 wherein the resource recovery tool is a valve.

14. A method for actuating a resource recovery tool using the system claimed in claim 1 comprising:
   contacting the tool profile with the traveling actuation member;
   sliding a land along a counter-land of the tool profile and then the first in time to occur of contacting an expander of the tool profile with a lead step and thereby expanding the tool profile or landing the traveling actuation member on the seat of the tool profile without resilient action.

15. A resource recovery system comprising:
   a borehole;
   a tubular string in the borehole;
   a traveling actuation member having a selective profile, the selective profile being resilient or rigid and possessed of a shoulder, the member being receivable in the string;
   a resource recovery tool in the string having a tool profile, the tool profile being resilient or rigid, providing at least one of the selective profile or the tool profile is resilient, the tool profile being possessed of a seat, the tool profile and selective profile being configured to engage the shoulder and seat without resilient action from any part of the traveling actuation member or the tool profile if the selective profile is complementary to the tool profile or to resiliently pass the traveling actuation member if the selective profile is not complementary to the tool profile.

16. The system as claimed in claim 15 wherein the resource recovery tool is a plurality of resource recovery tools each possessed of a counter-land having a specific length.

17. The system as claimed in claim 15 wherein upon disallowance of engagement of the seat of the tool profile and the shoulder of the selective profile, the traveling actuation member is configured to automatically contact sequential tool profiles until engagement occurs.

\* \* \* \* \*